US012784098B2

(12) United States Patent
Lee

(10) Patent No.: US 12,784,098 B2

(45) Date of Patent: *Nov. 3, 2026

(54) METHOD AND SYSTEM FOR CONVERTING ORDER BOOK DATA INTO 2D DATA FOR MACHINE LEARNING MODELS

(71) Applicant: REBELLIONS INC., Seongnam-si (KR)

(72) Inventor: Byungjae Lee, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 329 days.

This patent is subject to a terminal disclaimer.

(21) Appl. No.: 18/415,435

(22) Filed: Jan. 17, 2024

(65) Prior Publication Data

US 2024/0153003 A1 May 9, 2024

Related U.S. Application Data

(63) Continuation of application No. 18/054,506, filed on Nov. 10, 2022, now Pat. No. 11,915,316.

(30) Foreign Application Priority Data

Dec. 30, 2021 (KR) ........................ 10-2021-0192621

(51) Int. Cl.

*G06Q 40/04* (2012.01)

*G06Q 30/0283* (2023.01)

(52) U.S. Cl.

CPC ......... *G06Q 40/04* (2013.01); *G06Q 30/0283* (2013.01)

(58) Field of Classification Search

CPC .... G06Q 40/04; G06Q 40/06; G06Q 30/0201; G06Q 30/0206; G06Q 30/0202; G06Q 10/04; G06Q 30/0283

See application file for complete search history.

(56) References Cited

U.S. PATENT DOCUMENTS

2011/0178950 A1* 7/2011 Parga Landa .......... G06Q 40/04 705/36 R

2021/0035214 A1 2/2021 Kim et al.

FOREIGN PATENT DOCUMENTS

KR 10-1983752 B1 5/2019

KR 10-2020-0039037 A 4/2020

(Continued)

OTHER PUBLICATIONS

Notice of Allowance for KR 10-2021-0192621 by Korean Intellectual Property Office dated Nov. 4, 2024.

*Primary Examiner* — Jason M. Borlinghaus

(74) *Attorney, Agent, or Firm* — BROADVIEW IP LAW, PC

(57) ABSTRACT

Provided is a method for converting order book data into 2D data for a machine learning model, which is performed by one or more processors, in which the method includes acquiring order book data including data items for a plurality of bid prices and data items for a plurality of ask prices for a stock traded in a first stock exchange according to time from a time point in the past that is a predetermined period of time earlier, to a current time point, calculating a mid price based on a highest bid price of the plurality of bid prices and a lowest ask price of the plurality of ask prices, and generating data in tensor form having a first axis of times at certain time intervals and a second axis of prices in units of tick.

17 Claims, 13 Drawing Sheets

(4 of 13 Drawing Sheet(s) Filed in Color)

(56) References Cited

FOREIGN PATENT DOCUMENTS

| | | |
|---|---|---|
| KR | 10-2021-0015582 A | 2/2021 |
| KR | 10-2021-0063765 A | 6/2021 |

* cited by examiner

| | Quantity | Price |
|---|---|---|
| Ask level 3 | 31 | 69700 |
| Ask level 2 | 24 | 69600 |
| Ask level 1 | 6 | 69500 |
| Bid level 1 | 41 | 69200 |
| Bid level 2 | 47 | 69100 |
| Bid level 3 | 43 | 68900 |

410

| | | t |
|---|---|---|
| Q_mid_price+2tick | (69600) | 24 |
| Q_mid_price+1tick | (69500) | 6 |
| Q_mid_price | (69400) | 0 |
| Q_mid_price-1tick | (69300) | 41 |
| Q_mid_price-2tick | (69200) | 47 |
| Q_mid_price-3tick | (69100) | 0 |

412

| | Quantity | Price |
|---|---|---|
| Ask level 3 | 31 | 69700 |
| Ask level 2 | 24 | 69500 |
| Ask level 1 | 6 | 69500 |
| Bid level 1 | 41 | 69200 |
| Bid level 2 | 47 | 69100 |
| Bid level 3 | 43 | 68900 |

420

| | | t |
|---|---|---|
| Q_mid_price+2tick | (69600) | 24 |
| Q_mid_price+1tick | (69500) | 6 |
| Q_mid_price | (69400) | 0 |
| Q_mid_price-1tick | (69300) | 0 |
| Q_mid_price-2tick | (69200) | 41 |
| Q_mid_price-3tick | (69100) | 47 |

422

| | Quantity | Price |
|---|---|---|
| Ask level 3 | 25 | 69700 |
| Ask level 2 | 21 | 69600 |
| Ask level 1 | 3 | 69400 |
| Bid level 1 | 31 | 69300 |
| Bid level 2 | 37 | 69200 |
| Bid level 3 | 39 | 68900 |

| | Quantity | Price |
|---|---|---|
| Ask level 3 | 31 | 69700 |
| Ask level 2 | 24 | 69600 |
| Ask level 1 | 6 | 69500 |
| Bid level 1 | 41 | 69200 |
| Bid level 2 | 47 | 69100 |
| Bid level 3 | 43 | 68900 |

430

| | | t-1δ | t |
|---|---|---|---|
| Q_mid_price+2tick | (69600) | 21 | 24 |
| Q_mid_price+1tick | (69500) | 0 | 6 |
| Q_mid_price | (69400) | 3 | 0 |
| Q_mid_price-1tick | (69300) | 31 | 0 |
| Q_mid_price-2tick | (69200) | 37 | 41 |
| Q_mid_price-3tick | (69100) | 0 | 47 |

432

FIG. 4

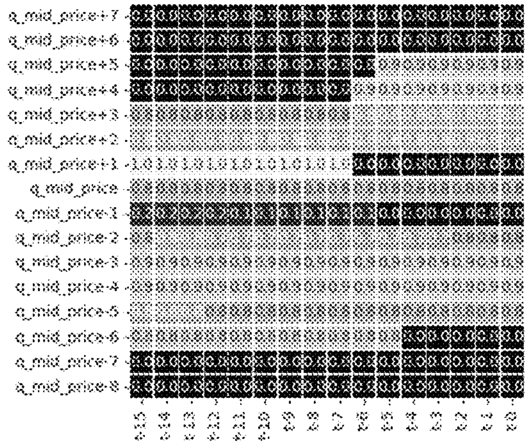
520
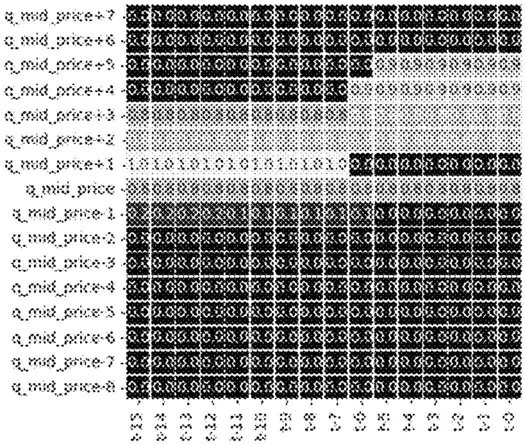
610
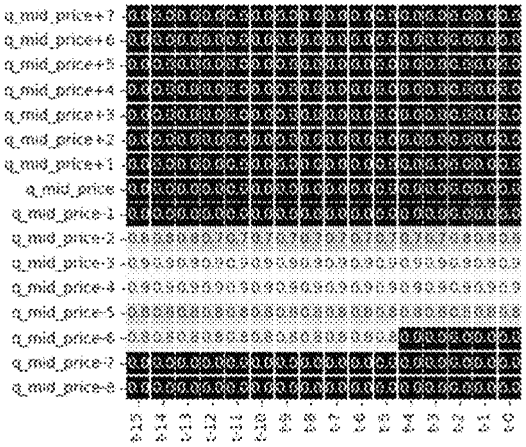
620
FIG. 6

METHOD AND SYSTEM FOR CONVERTING ORDER BOOK DATA INTO 2D DATA FOR MACHINE LEARNING MODELS

CROSS-REFERENCE TO RELATED APPLICATION

This application is a continuation of U.S. application Ser. No. 18/054,506, filed on Nov. 10, 2022, which is based on and claims priority to Korean Patent Application No. 10-2021-0192621, filed on Dec. 30, 2021, in the Korean Intellectual Property Office, the disclosure of which is incorporated herein by reference in its entirety.

TECHNICAL FIELD

The present disclosure relates to a method and a system for converting order book data into 2D data for a machine learning model, and specifically, to a method and a system for generating data in tensor form having a first axis of times and a second axis of prices in units of tick, in which the data in tensor form includes one or more 2D data items having data for a quantity for each of a plurality of ask prices or data for a quantity for each of a plurality of bid prices as values for each of a plurality of coordinates defined according to the times on the first axis and the prices on the second axis.

BACKGROUND

Recently, machine learning model is used for the prediction of stock prices. In particular, the order book data, which includes information on an ask price of a prospective buyer and information on a bid price of a prospective seller existing in the securities market, is actively used for the stock price prediction. The stock price prediction using machine learning models has an advantage of being able to find features that the traditional algorithms cannot find from the complex information in the market.

On the other hand, machine learning models (e.g., CNNs) specialized in pattern recognition mostly receive 2D data as input, but since the order book data is generally stored in table form, there is a problem that it is not suitable as the input for such a machine learning model. In addition, when the order book data in table form is converted into 2D data, there is a problem that important information for stock price prediction can be lost, and accordingly, the prediction performance of the machine learning model can be deteriorated.

SUMMARY

In order to address one or more problems (e.g., the problems described above and/or other problems not explicitly described herein), the present disclosure provides a method for, a non-transitory computer-readable recording medium storing instructions for, and an apparatus (system) for converting order book data into 2D data for a machine learning model.

The present disclosure may be implemented in a variety of ways, including a method, an apparatus (system), or a non-transitory computer-readable recording medium storing instructions.

A method for converting order book data into 2D data for a machine learning model is provided, in which the method may be performed by one or more processors and include acquiring order book data including data items for a plurality of bid prices and data items for a plurality of ask prices for a stock traded in a first stock exchange according to time from a time point in the past that is a predetermined period of time earlier, to a current time point, calculating a mid price based on a highest bid price of the plurality of bid prices and a lowest ask price of the plurality of ask prices, and generating data in tensor form having a first axis of times at certain time intervals and a second axis of prices in units of tick, wherein the data in tensor form includes one or more 2D data items having data for a quantity for each of the plurality of ask prices or data for a quantity for each of the plurality of bid prices as values for each of a plurality of coordinates defined according to the times on the first axis and the prices on the second axis, in which the price in units of tick may include the calculated mid price.

The data in tensor form may include 2D data corresponding to each of a plurality of channels, the plurality of channels may include a first channel and a second channel, and the data in tensor form may include 2D data corresponding to the first channel, which is for a bid price of a stock traded in the first stock exchange according to the time, and 2D data corresponding to the second channel, which is for an ask price of a stock traded in the first stock exchange according the time.

The data in tensor form may further include a third channel and a fourth channel, and the data in tensor form may include 2D data corresponding to the third channel, which is for a bid price of a stock traded in the second stock exchange according to the time, and 2D data corresponding to the fourth channel, which is for an ask price of a stock traded in the second stock exchange according to the time.

The data in tensor form may further include a fifth channel and a sixth channel, and the data in tensor form may include 2D data including a value indicative of coordinates on the first axis in each of the one or more 2D data items, and 2D data including a value indicative of coordinates on the second axis in each of the one or more 2D data items.

The generating data in tensor form may include normalizing a quantity for each of the plurality of ask prices and a quantity for each of the plurality of bid prices, and associating the normalized quantity with each of a plurality of coordinates defined according to the times on the first axis and the prices on the second axis.

The method may further include, as the current time point changes, repeatedly performing the acquiring, the calculating, and the generating with respect to the order book data from the changed current time point to a time point in the past that is the predetermined period earlier.

The method may further include inputting the generated data in tensor form into a machine learning model including a plurality of layers and outputting a prediction result, in which the prediction result may include prediction information on a price of the stock at a time point in the future that is a predetermined period after the current time point.

The prediction information may include a first class indicating that the price of the stock at the time point in the future would be higher than a price at the current time point, a second class indicating that the price of the stock at the time point in the future would be the same as the price at the current time point, and a third class indicating that the price of the stock at the time point in the future would be lower than the price at the current time point.

There is provided a non-transitory computer-readable recording medium storing instructions for executing the method on a computer.

A system for converting order book data into 2D data for a machine learning model is provided, which may include a memory storing one or more instructions, and one or more processors configured to execute one or more instructions in the memory to acquire order book data including data items for a plurality of bid prices and data items for a plurality of ask prices for a stock traded in a first stock exchange according to time from a time point in the past that is a predetermined period of time earlier, to a current time point, calculate a mid price based on the highest bid price of the plurality of bid prices and the lowest ask price of the plurality of ask prices, and generate data in tensor form having a first axis of times at certain time intervals and a second axis of prices in units of tick, wherein the data in tensor form includes one or more 2D data items having data for a quantity for each of the plurality of ask prices or data for a quantity for each of the plurality of bid prices as values for each of a plurality of coordinates defined according to the times on the first axis and the prices on the second axis, in which the price in units of tick may include the calculated mid price.

According to some examples, the order book data in table form may be converted into 2D data without loss of important information for predicting future market conditions.

Since the information on the bid price and the information on the ask price are separately included in separate channels, the machine learning model can clearly distinguish the information on the bid price from the information on the ask price, and as a result, the prediction performance of the machine learning model can be improved.

By using a machine learning model configured such that the 2D data and the interpretation map included in the input data have the same size, accurate information on the part that influenced the output of the prediction result can be provided.

By applying the interpretation map to the explainable data, intuitively understandable interpretation information can be provided.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present disclosure would be described with reference to the accompanying drawings described below, where similar reference numerals indicate similar elements, but not limited thereto, in which:

FIG. 4 is a diagram illustrating an example of a method for converting order book data into 2D data;

FIG. 6 is a diagram illustrating an example of a method for generating data in tensor form;

DETAILED DESCRIPTION

Figure 1:
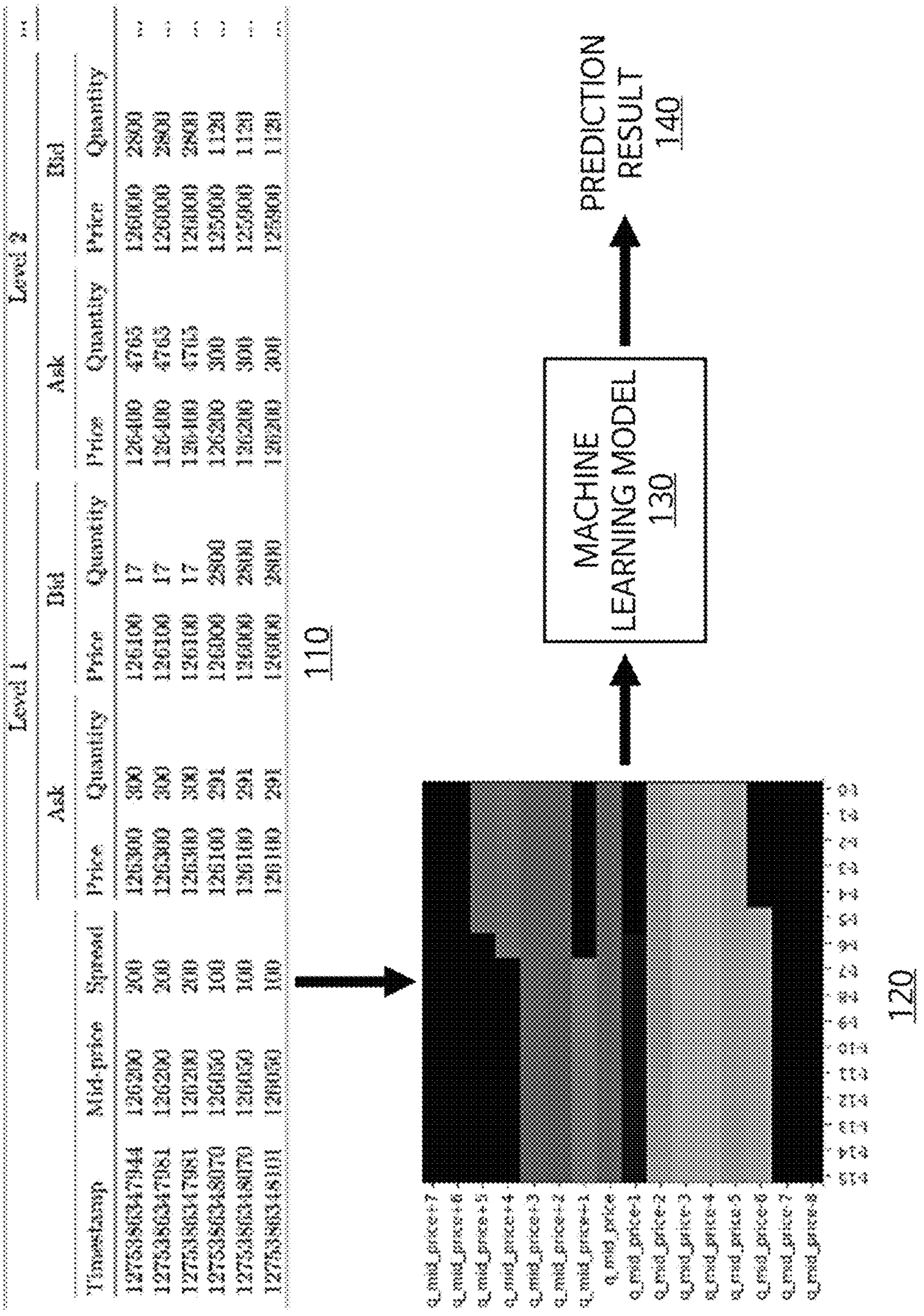
FIG. 1 is a schematic diagram illustrating an example of a method for converting order book data into 2D data for a machine learning model.

Hereinafter, examples for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the embodiment(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, the "machine learning model" may include any model that is used for inferring an answer to a given input. The machine learning model may include an artificial neural network model including an input layer, a plurality of hidden layers, and an output layer. Each layer may include a plurality of nodes. In addition, in the present disclosure, the machine learning model may refer to an artificial neural network model, and the artificial neural network model may refer to the machine learning model.

In the present disclosure, a "display" may refer to any display device associated with a computing device, and for example, it may refer to any display device that is controlled by the computing device, or that can display any information/data provided from the computing device.

In the present disclosure, "each of a plurality of A" may refer to each of all components included in the plurality of A, or may refer to each of some of the components included in a plurality of A. For example, each of the one or more channels may refer to each of all channels included in the one or more channels, or may refer to each of some channels included in the one or more channels. Likewise, each of the pixels included in the 2D image may refer to each of all pixels included in the 2D image or may refer to each of some pixels included in the 2D image.

In this disclosure, "data" may refer to a data item, and "data item" may refer to data.

In the present disclosure, the term "item" may refer to securities such as stocks, bonds, and derivatives (options, futures, and the like) that are subject to trading in the securities market, classified according to content and format. In addition to the individual items, the items may also include index-related items, industrial sector-related items, items for specific commodities (e.g., crude oil, agricultural products, gold, and the like), exchange rate-related items, and the like.

In the present disclosure, a "stock exchange" refers to a place where securities circulated in at least one country are traded, and refers to a brokerage agency that lists and trades securities issued by each company or information. The stock exchange may include a system of the stock exchange.

In the present disclosure, "order book (OB or limit order book; LoB)" or "order book data" may refer to data including information (bid price, quantity, and the like) on the bid price of the buyer in the securities market who wants to buy, and information (ask price, quantity, and the like) on the ask price of the seller who wants to sell. The order book or the order book data may include data in table form.

In the present disclosure, the "Top of the Book (ToB)" may include information on the highest bid price (price, quantity, and the like) and information on the lowest ask price (price, quantity, and the like).

In the present disclosure, a "spread" may refer to a difference between the highest bid price and the lowest ask price, that is, the difference between the upper ends of the two order books.

In the present disclosure, an "image" may be used interchangeably with "data in tensor form".

FIG. 1 is a schematic diagram illustrating an example of a method for converting order book data 110 into 2D data for a machine learning model 130. The information processing system may use the machine learning model 130 to generate a prediction result 140 for a specific stock based on the market data from the past to the present for the specific stock traded in a specific stock exchange. For example, the information processing system may use the machine learning model 130 to generate prediction information on the price at a time point in the future of a specific stock based on the order book data 110 from the past to the present for the specific stock. In this case, if the machine learning model 130 is a type of machine learning model 130 (e.g., a convolutional neural network (CNN)) that has a structure suitable for learning 2D data, the input data may be required to be input as data 120 in tensor form including one or more 2D data items.

In the present disclosure, the data 120 in the tensor form including one or more 2D data items may be a concept that includes a 2D image. For example, a 2D image of grayscale may be data in tensor form including 2D data corresponding to one channel, and RGB 2D image may be data in tensor form including 2D data corresponding to each of three channels of a red channel, a green channel, and a blue channel.

Meanwhile, the order book data 110 may be data including data items for a plurality of bid prices and data items for a plurality of ask prices for a specific stock traded in a specific stock exchange, and each of the data items for a plurality of bid prices and the data items for a plurality of ask prices may include data for a request price and quantity. In general, the order book data 110 is represented in a table form as illustrated in FIG. 1. Therefore, the information processing system may use the machine learning model 130 (e.g., CNN) to convert the order book data 110 into the data 120 in tensor form including one or more 2D data items so as to generate prediction information on the future price of a specific stock based on the order book data 110 for the corresponding stock. In this case, depending on the method for converting the order book data 110 in table form into the data 120 in tensor form, information of the order book data 110 may be lost, and depending on whether or not the converted data 120 in tensor form is in a form that is easy for the machine learning model to learn or infer, the learning or inference performance of the machine learning model can be affected. Accordingly, the present disclosure proposes a method for converting the order book data 110 into the data 120 in tensor form, which is in such a form that is easy for the machine learning model to learn or infer without loss of data.

The converted data 120 in tensor form may include a 2D data item related to a bid price and a 2D data item related to an ask price. The 2D data item related to the bid price and the 2D data item related to the ask price may be included in separate channels of the data 120 in tensor form. Accordingly, data related to a bid and data related to an ask are clearly distinguished, and the machine learning model can learn or infer by accurately distinguishing the data related to bid from the data related to ask.

Each of the 2D data items included in the data 120 in tensor form may have a time axis and a price axis, and the time axis may include time points at certain time intervals among the time points from the past to the present, and the price axis may include prices in units of tick. In addition, each of the 2D data items may include, as a value for the coordinates defined along the time axis and the price axis, data for the ask quantity of each ask price at each time or data for the bid quantity of each bid price at each time.

A price with no bid quantity and no ask quantity may also be included in the price axis. In addition, the information processing system may calculate a mid price based on the highest bid price of the plurality of bid prices included in the order book data 110 and the lowest ask price of the plurality of ask prices included in the order book data 110, and include the calculated result in the price axis of the 2D data item. With such a configuration, the order book data 110 can be converted into the data 120 in tensor form without losing important information for price prediction at a time point in the future, such as information on the quantity for each order level of buy and sell, spread, mid price, and the like. Details of the method for converting the order book data 110 into the data 120 in tensor form including one or more 2D data items will be described below with reference to FIGS. 4 to 6.

The information processing system may input the converted data 120 in tensor form to the machine learning model 130 and output the prediction result 140. For example, the information processing system may input the converted data 120 in tensor form to the machine learning model 130, and output prediction information on the price (e.g., mid price, market price, and the like) of a specific stock at a time point in the future that is a predetermined period of time after the current time point. The prediction information on the price of a specific stock may include a first class indicating that the price of the specific stock at the time point in the future would be higher than the price at the current time point, a second class indicating that the price of the specific stock at the time point in the future would be the same as the price at the current time point, and a third class indicating that the price of the specific stock at the time point in the future would be lower than the price at the current time point.

The information processing system may repeatedly perform the process of converting the order book data 110 into the data 120 in tensor form and/or the process of inputting the converted data 120 in tensor form into the machine learning model 130 and outputting the prediction result 140 a plurality of times over time. With such a configuration, it is possible to repeatedly generate the latest prediction result using the latest data.

Figure 2:
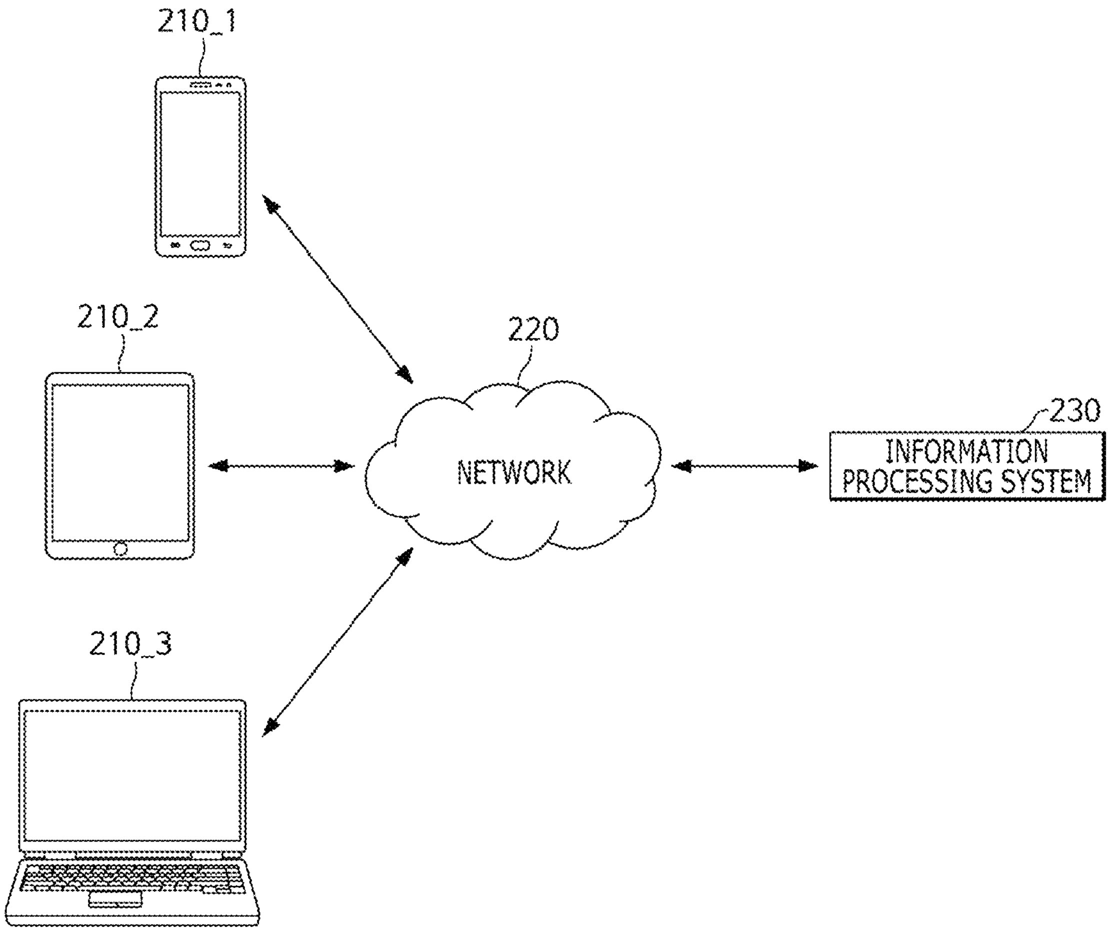
FIG. 2 is a schematic diagram illustrating a configuration in which an information processing system is communicatively connected to a plurality of user terminals.

FIG. 2 is a schematic diagram illustrating a configuration in which an information processing system 230 is communicatively connected to a plurality of user terminals 210_1, 210_2, and 210_3. As illustrated, the plurality of user terminals 210_1, 210_2, and 210_3 may be connected to the information processing system 230 that is capable of providing a stock price prediction service through a network 220. In this case, the plurality of user terminals 210_1, 210_2, and 210_3 may include a terminal of a user to be provided with a stock price prediction service and/or an operator of the stock price prediction service. The information processing system 230 may include one or more server devices and/or databases, or one or more distributed computing devices and/or distributed databases based on cloud computing services that can store, provide and execute computer-executable programs (e.g., downloadable applications) and data relating to the provision of stock price prediction service and the like.

The stock price prediction service provided by the information processing system 230 may be provided to the user through a stock price prediction application, a stock trading application, a derivatives trading application, a mobile browser application, or a web browser installed in each of the plurality of user terminals 210_1, 210_2, and 210_3. For example, the information processing system 230 may provide information corresponding to a price prediction request or a request to interpret the price prediction received from the user terminals 210_1, 210_2, and 210_3 through a stock price prediction application or the like, or may perform a corresponding process.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between the user terminals 210_1, 210_2, and 210_3, but aspects are not limited thereto.

In FIG. 2, a mobile phone terminal 210_1, a tablet terminal 210_2, and a PC terminal 210_3 are illustrated as the examples of the user terminals, but are not limited thereto, and the user terminals 210_1, 210_2 and 210_3 may be any computing device that is capable of wired and/or wireless communication and that can be installed with a stock price prediction application, a stock trading application, a derivatives trading application, a mobile browser application, or a web browser, and so on and execute the same. For example, the user terminal may include an AI speaker, a smart phone, a mobile phone, a navigation, a computer, a notebook, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, a set-top box, and so on. In addition, while FIG. 2 illustrates that three user terminals 210_1, 210_2, and 210_3 are in communication with the information processing system 230 through the network 220, aspects are not limited thereto, and a different number of user terminals may be configured to be in communication with the information processing system 230 through the network 220.

The information processing system 230 may receive a request for prediction of a price of a specific stock from the plurality of user terminals 210_1, 210_2 and 210_3. In this case, the information processing system 230 may acquire order book data including data items for a plurality of bid prices and data items for a plurality of ask prices for the corresponding stock according to time from a time point in the past that is a predetermined period of time earlier, to a current time point, and calculate a mid price based on the highest bid price of the plurality of bid prices and the lowest ask price of the plurality of ask prices. The information processing system 230 may generate data in tensor form in which the time at a certain time interval is on the first axis and the price in units of tick is on the second axis, including one or more 2D data items having data for a quantity for each of the plurality of ask prices or data for a quantity for each of the plurality of bid prices as values for each of a plurality of coordinates defined according to the time on the first axis and the price on the second axis. The information processing system 230 may input the generated data in tensor form to a machine learning model including a plurality of layers, output a prediction result, and provide the prediction result to the user terminals 210_1, 210_2, and 210_3 through the network 220.

According to another example, the information processing system 230 may receive a request for information on the interpretation of price prediction from the plurality of user terminals 210_1, 210_2, and 210_3. In this case, the information processing system 230 may generate an interpretation map for the prediction result using a feature map that is an output from at least one layer of a plurality of layers included in machine learning, and generate explainable data based on the data in table form and the data in tensor form. The information processing system 230 may apply the interpretation map to the explainable data, and provide the explainable data applied with the interpretation map to the user terminals 210_1, 210_2, and 210_3 through the network 220.

Figure 3:
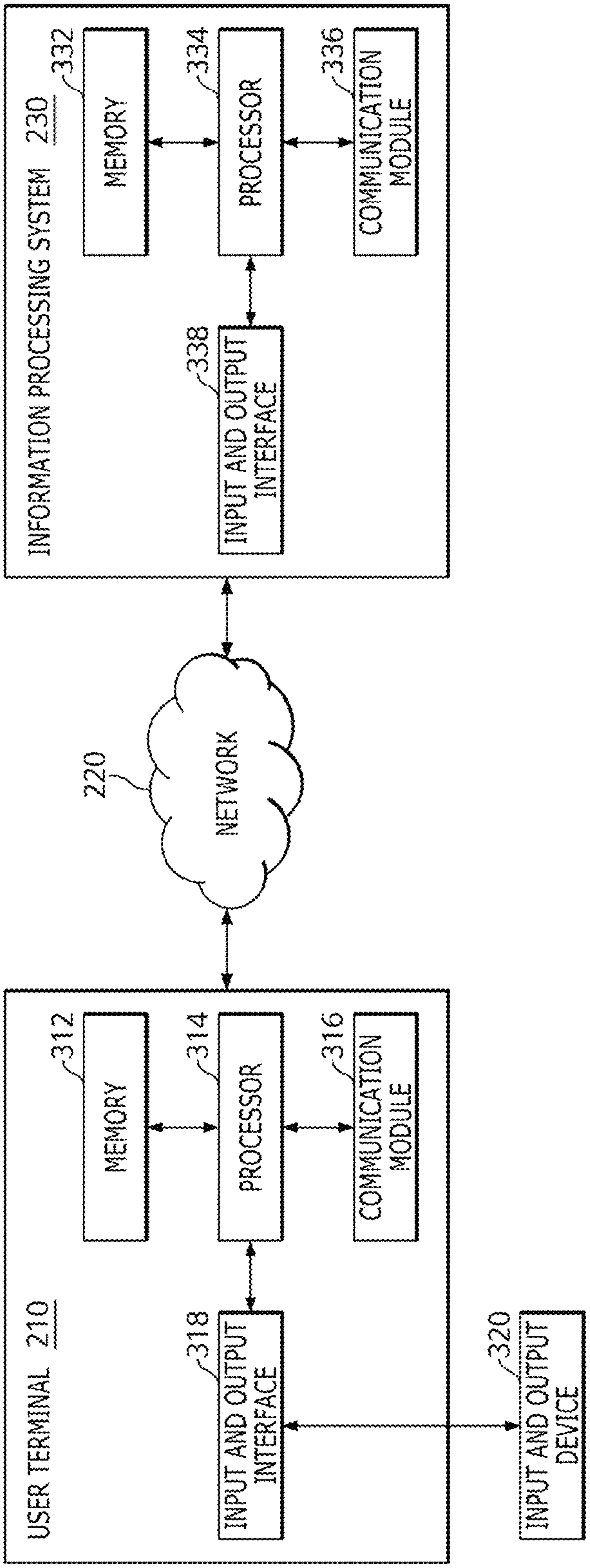
FIG. 3 is a block diagram of an internal configuration of the user terminal and the information processing system.

FIG. 3 is a block diagram illustrating an internal configuration of the user terminal 210 and the information processing system 230. The user terminal 210 may refer to any computing device that is capable of executing a stock price prediction application, a stock trading application, a derivatives trading application, a mobile browser application or a web browser, and so on and is also capable of wired/wireless communication, and may include the mobile phone terminal 210_1, the tablet terminal 210_2, and the PC terminal 210_3 of FIG. 2, and so on, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using respective communication modules 316 and 336. In addition, an input and output device 320 may be configured to input information and/or data to the user terminal 210 or output information and/or data generated from the user terminal 210 through the input and output interface 318.

The memories 312 and 332 may include any non-transitory computer-readable recording medium. The memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and at least one program code (e.g., a code for a stock price prediction application, and the like installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than the computer-readable recording medium. For example, at least one program may be loaded into the memories 312 and 332 based on a computer program installed by files provided by developers or a file distribution system that distributes an installation file of an application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to predict stock prices, a request for information on interpretation of prediction results, and the like) generated by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 through the communication module 336 and the network 220. For example, the user terminal 210 may receive the predicted stock price, the interpretation information on the prediction result, and the like from the information processing system 230 through the communication module 316.

The input and output interface 318 may be a means for interfacing with the input and output device 320. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device integrating inputting and outputting configurations or functions, such as a touch screen or the like. For example, if the processor 314 of the user terminal 210 processes the instructions of the computer program loaded into the memory 312, a service screen or the like, which is configured with the information and/or data provided by the information processing system 230 or another user terminals, may be displayed on the display through the input and output interface 318. While FIG. 3 illustrates that the input and output device 320 is not included in the user terminal 210, aspects are not limited thereto, and an input and output device may be configured as one device with the user terminal 210. In addition, the input and output interface 338 of the information processing system 230 may be a means for interfacing with a device (not illustrated) for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a Global Positioning System (GPS) module, a camera, various sensors, a database, and the like. For example, if the user terminal 210 is a smartphone, it may include components generally included in the smartphone. For example, in an implementation, various components such as an acceleration sensor, a gyro sensor, a camera module, various physical buttons, buttons using a touch panel, input and output ports, a vibrator for vibration, and so on may be further included in the user terminal 210. The processor 314 of the user terminal 210 may be configured to operate an application or the like that provides a stock price prediction service. In this case, a code associated with the application and/or program may be loaded into the memory 312 of the user terminal 210.

While the program for the application or the like that provides stock price prediction service is being operated, the processor 314 may receive text, image, video, audio, and/or action, and so on inputted or selected through the input device such as a touch screen connected to the input and output interface 318, a keyboard, a camera including an audio sensor and/or an image sensor, a microphone, and so on, and store the received text, image, video, audio, and/or action, and so on in the memory 312, or provide the same to the information processing system 230 through the communication module 316 and the network 220. For example, the processor 314 may receive a user input that requests to predict a price for a specific stock, and provide it to the information processing system 230 through the communication module 316 and the network 220. As another example, the processor 314 may receive a user input requesting for the interpretation information on the prediction result through the input device 320 and provide it to the information processing system 230 through the network 220 and the communication module 316.

The processor 314 of the user terminal 210 may be configured to manage, process, and/or store the information and/or data received from the input device 320, another user terminal, the information processing system 230 and/or a plurality of external systems. The information and/or data processed by the processor 314 may be provided to the information processing system 230 through the communication module 316 and the network 220. The processor 314 of the user terminal 210 may transmit the information and/or data to the input and output device 320 through the input and output interface 318 to output the same. For example, the processor 314 may display the received information and/or data on a screen of the user terminal.

The processor 334 of the information processing system 230 may be configured to manage, process, and/or store information and/or data received from the plurality of user terminals 210 and/or a plurality of external systems. The information and/or data processed by the processor 334 may be provided to the user terminals 210 through the communication module 336 and the network 220. The processor 334 of the information processing system 230 may convert the order book data into data in tensor form based on the stock price prediction request from the plurality of user terminals 210, input the corresponding data to the machine learning model, and provide the output prediction result to the user terminal 210 through the communication module 336 and the network 220.

The processor 334 of the information processing system 230 may be configured to output the processed information and/or data through the output device 320 such as a device (e.g., a touch screen, a display, and so on) capable of outputting a display of the user terminal 210 or a device (e.g., a speaker) capable of outputting an audio. For example, the processor 334 of the information processing system 230 may be configured to provide the price prediction result for a specific stock to the user terminal 210 through the communication module 336 and the network 220, and output the product planning exhibition through a device capable of outputting a display, or the like of the user terminal 210. As another example, the processor 334 of the information processing system 230 may be configured to provide the interpretation information and the like related to the price prediction result to the user terminal 210 through the communication module 336 and the network 220, and output the same through the device capable of outputting a display or the like of the user terminal 210.

FIG. 4 is a diagram illustrating an example of a method for converting order book data 410, 420, and 430 into 2D data 412, 422, and 432. The order book data 410, 420, and 430 may include at least some of information on valid ask price and quantity and bid price and quantity for a specific stock at one or more time points. For example, the first order book data 410 may include at least some of information on the valid ask price and quantity and the bid price and quantity for the first stock at time point (t), and the second order book data 420 may include at least some of information on the valid ask price and quantity and the bid price and quantity for the second stock at time point (t). In addition, the third order book data 430 may include at least some of information on the valid ask price and quantity and the bid price and quantity for the second stock at time point (t) and time point (t−1) (that is, a time point that is 1 time unit before time point (t)).

Meanwhile, the tick may refer to a minimum unit of price for a bid or ask, and a predetermined value for each stock traded in the stock exchange may be used as a tick. For example, the tick of the first stock of the first order book data 410, the second stock of the second order book data 420 and the third order book data 430 may be 100 won (in Korean currency). That is, the bid or ask may be in units of 100 won, and the market price may be formed in units of 100 won in the similar manner.

The information processing system may calculate a mid price at time point (t) (e.g., the most recent time point (t)o be included in the time axis of the 2D data 412, 422, and 432) so as to determine the price axis of the 2D data 412, 422, and 432. For example, the mid price may be calculated by Equation 1 below.

$$\text{mid price} = \frac{ToB_{ask} + ToB_{bid}}{2} \qquad \text{<Equation 1>}$$

where, ToB_ask denotes the lowest ask price, and ToB-_bid denotes the highest bid price. That is, the mid price according to Equation 1 may be calculated as an average of the lowest ask price and the highest bid price. For example, the mid price at time point (t) according to Equation 1 calculated from the first order book data 410 is 69,400 won.

Meanwhile, the mid price according to Equation 1 at time point (t) calculated from the second order book data 420 and the third order book data 430 is 69,350 won, which is the price that does not correspond to the second stock and the price of the second stock in units of tick. That is, it is not possible to perform bidding and asking at this price and a market price cannot be formed. Accordingly, the information processing system may calculate a quantized mid price such that the mid price is a price in units of tick. For example, the quantized mid price may be calculated by Equation 2 below.

$$\text{quantized mid price} = \text{ceil}\left(\frac{\text{mid price}}{\text{tick}}\right) \times \text{tick} \qquad \text{<Equation 2>}$$

where, 'mid price' denotes a mid price according to Equation 1, 'tick' denotes a tick, and 'ceil' denotes a rounding operation performed at the first decimal place (in some examples, a rounding operation may be performed instead of the rounding operation). In some examples of the present disclosure, the mid price may refer to a quantized mid price set to a price in units of tick. According to Equation 2, calculating the quantized mid price from each of the first order book data 410, the second order book data 420, and the third order book data 430 always gives 69,400 won which is the price in units of tick.

The information processing system may include, in the price axis of the 2D data 412, 422, and 432, successive prices in units of tick, including the calculated (quantized) mid price. For example, as illustrated, the information processing system may include, in the price axis, prices ranging from (mid price−3 ticks) to (mid price+2 ticks) based on the mid price. In order to balance the ask price and the bid price, the prices included in the price axis may be determined such that the mid price is positioned near the middle of the price axis.

The order book data 410, 420, and 430 may not include information on a price at which the bid quantity and the ask quantity are 0. For example, the first order book data 410 does not include information on 69,100 won and 69400 won, the price at which the bid quantity and the ask quantity are 0 at time point (t), and the second order book data 420 does not include information on 69000 won, 69300 won, and 69400 won, the prices at which the bid quantity and the ask quantity are 0 at time point (t). Since the order book data 410, 420, and 430 includes information on the price itself, even if there is no information on the price with a quantity of 0, information such as the spread, and the like can be extracted from the order book data 410, 420, and 430. However, since the 2D data 412, 422, and 432 does not include information on the price itself included in the price axis, if information on the price with a quantity of 0 is not included, some of the important information for the prediction of price at a time point in the future, such as spread and the like, may be lost. Therefore, by including successive prices in units of tick in the price axis of the 2D data 412, 422, and 432, quantity information on the price at which the ask quantity and the bid quantity is 0 is also included, so that loss of important information such as spreads and the like can be prevented.

The values of the 2D data 412, 422, and 432 may be determined as the ask quantity or the bid quantity of each price at each time. If both the ask quantity and the bid quantity at a specific price at a specific time are 0, a value corresponding to the coordinates of the corresponding time and corresponding price may be determined to be 0. In FIG. 4, the method for converting the order book data 410, 420, and 430 into 2D data 412, 422, and 432 by using small data has been described in detail as an example for clear understanding. An example of a method for generating 2D data (or data in tensor form including the one or more 2D data items) will now be described more generally with reference to FIGS. 5 to 6.

Figure 5:
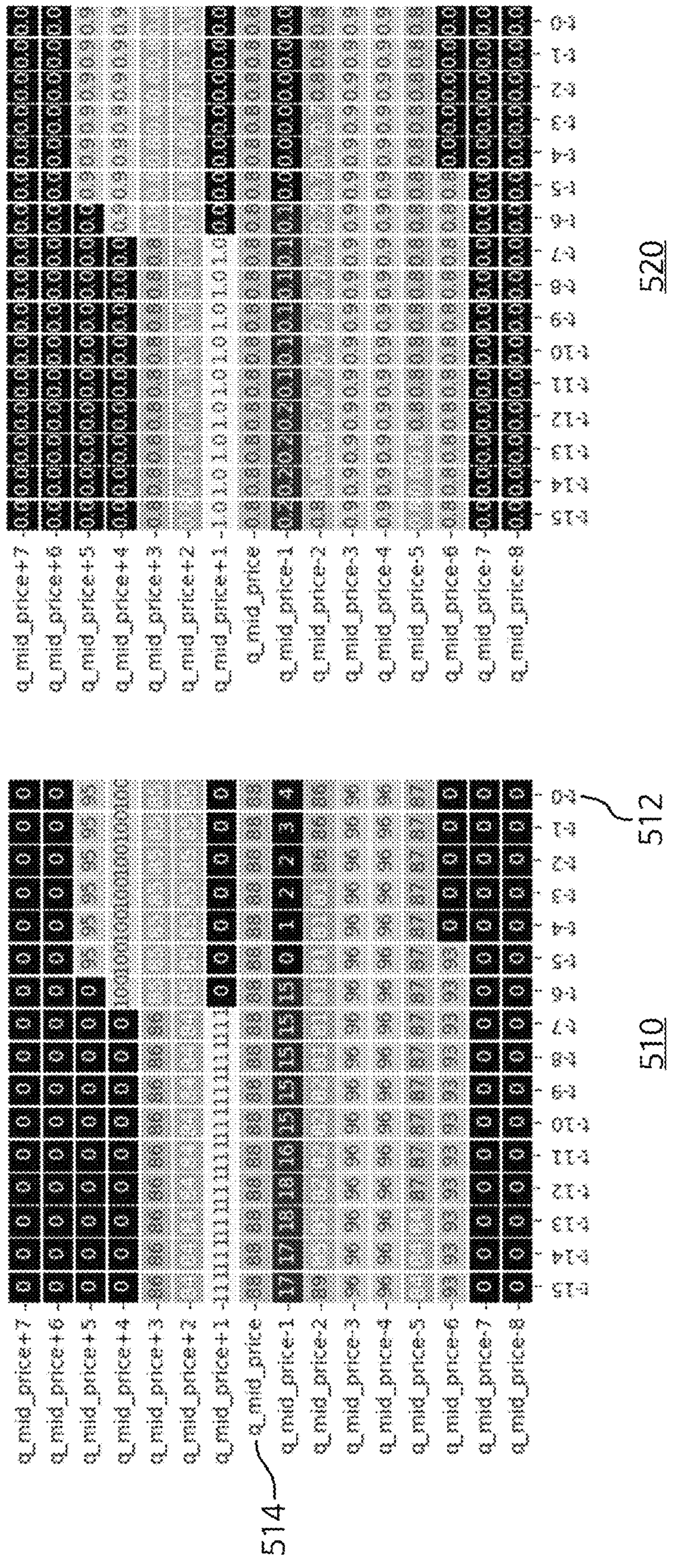
FIG. 5 is a diagram illustrating an example of a method for generating 2D data and normalizing the generated 2D data.

FIG. 5 is a diagram illustrating an example of a method for generating 2D data 510 and normalizing the generated 2D data. The information processing system may first determine a time axis of the 2D data 510 to generate the 2D data 510. For example, the information processing system may select a time point (t) 512, which is a current time point (e.g., the most recent time point), and select one or more consecutive time points at regular time intervals including the time point (t) (512). As a specific example, as illustrated, 16 time points may be selected, including time point (t)(512) through time point (t−15) (a time point that is 15 time units before the time point (t)). The order book data including data at one or more time points determined on the time axis may be obtained.

The information processing system may determine the price axis of the 2D data 510. For example, the information processing system may calculate a mid price 514 at time point (t) which is the current time point (e.g., the most recent time point). In this case, the mid price 514 may be the quantized mid price described above in FIG. 4. One or more consecutive prices in units of tick including the calculated mid price 514 may be included in the price axis of the 2D data. As a specific example, as illustrated, prices ranging from (mid price−8 ticks) to (mid price+7 ticks) may be included in the price axis. The price axis may be determined such that the mid price 514 is positioned near the middle of the price axis in order to balance the ask price and the bid price.

The information processing system may determine, as the value of the 2D data 510, the ask quantity or the bid quantity of each price included in the price axis at each time point included in the time axis. If both the ask quantity and the bid quantity at a specific price at a specific time are 0, a value corresponding to the coordinates of the corresponding time and corresponding price may be determined to be 0. As described above, the 2D data 510 may be generated.

The information processing system may normalize the generated 2D data 510. For example, as illustrated, the information processing system may normalize the generated 2D data 510 through a min-max normalization method to generate the normalized 2D data 520. In FIG. 5, the 2D data 520 normalized through the min-max normalization method is illustrated as an example, but aspects are not limited thereto, and the normalized 2D data 520 may be generated through various normalization methods such as mean-zero variance-one normalization, and the like. In some examples of the present disclosure, 2D data may refer to normalized 2D data 520.

FIG. 6 is a diagram illustrating an example of a method for generating data in tensor form; The information processing system may divide the (normalized) 2D data 520 into two 2D data items 610 and 620. For example, the information processing system may divide the 2D data 520 into 2D data 610 for the ask price and 2D data 620 for the bid price. The information processing system may stack the two separated 2D data items 610 and 620 as a channel axis to generate data in tensor form. That is, the data in tensor form may include the 2D data 610 for an ask price corresponding to the first channel and the 2D data 620 for a bid price corresponding to the second channel. As described above, because the 2D data 610 for the ask price and the 2D data 620 for the bid price are separated into separate channels, the machine learning model can learn and infer by clearly distinguishing the information related to an ask from the information related to a bid, and as a result, it is possible to improve the performance of the machine learning model.

The information processing system may repeatedly perform the process of converting the order book data into data in tensor form a plurality of times as the current time point changes. In this case, as the time point (t) changes, the information processing system may newly calculate the mid price by using the new order book data at the time point (t), and accordingly, the price axis may be newly determined.

Figure 7:
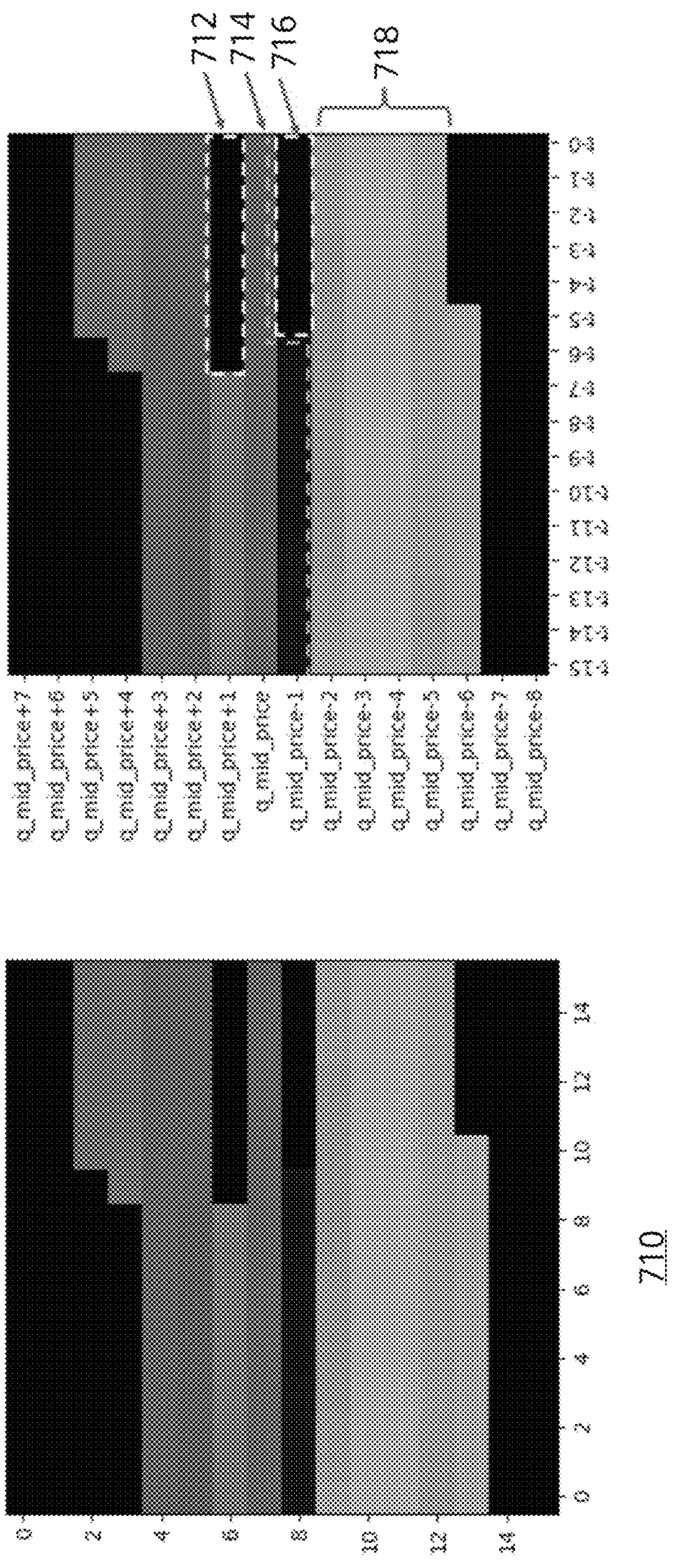
FIG. 7 is a diagram illustrating an example of data in tensor form.

FIG. 7 is a diagram illustrating an example of data 710 in tensor form. The data in tensor form may include the 2D data for an ask price corresponding to the first channel and the 2D data for a bid price corresponding to the second channel. FIG. 7 illustrates an image of the data in tensor form, representing each channel included in the data in tensor form as an image corresponding to a separate color channel. The 2D data for the ask price corresponding to the first channel is represented in a Red channel, and the 2D data for the bid price corresponding to the second channel is represented in a Green channel, so that the data in tensor form including two channels is represented in one image. In addition, as the color of the pixel is darker, the value of the corresponding cell may decrease, and as the color of the pixel is brighter, the value of the corresponding cell may increase.

The data in tensor form as illustrated includes not only the information on the bid quantity or the ask quantity at each price at each time point, but also the quantity information for the price at which both information on the bid quantity and the ask quantity is 0, and the information on the distance by which the price corresponding to each quantity deviates from the mid price, in which the channel related to the ask price and the channel related to the bid price are separated. Accordingly, the data in tensor form as illustrated may include important information for the price prediction without loss. For example, a blank 712 between the ask prices may include information on the presence of empty price between the ask levels, and a price change 714 of the lowest ask level (ask level 1) and/or the highest bid level (bid level 1) may include information on a change in the mid price, and a pixel 716 between the lowest ask level (ask level 1) and/or the highest bid level (bid level 1) may include information on the spread. In addition, a difference 718 of the quantity data of each ask/bid price may include information on the quantity difference between each bid/ask level. As described above, the data in tensor form according to the present disclosure may include important information for price prediction without loss, and accordingly, the performance of predicting future market conditions can be improved.

Figure 8:
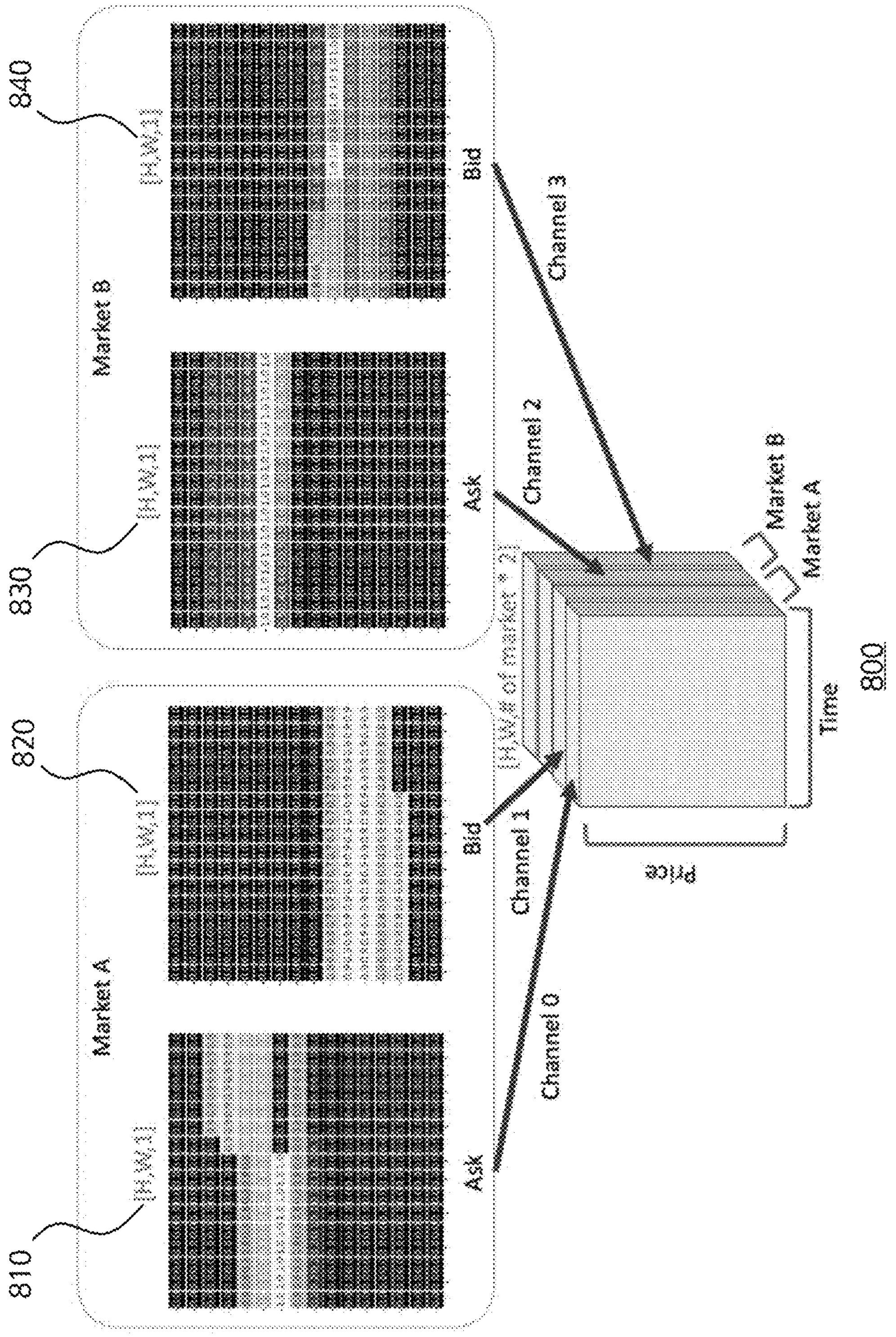
FIG. 8 is a diagram illustrating an example of data in tensor form including three or more channels.

FIG. 8 is a diagram illustrating an example of data 800 in tensor form including three or more channels. In the above description, the data in tensor form has been described as an example, which includes two channels corresponding to the 2D data for the ask price of a specific stock traded at a specific stock exchange and 2D data for the bid price of a specific stock traded at a specific stock exchange, respectively, but the data 800 in tensor form may include three or more channels. For example, the data 800 in tensor form may include four channels corresponding to 2D data 810 for the ask price of the first stock traded in the first stock exchange, 2D data 820 for the bid price of the first stock traded in the first stock exchange, 2D data 830 for the ask price of the first stock traded in the second stock exchange, and 2D data 840 for the bid price of the first stock traded in the second stock exchange, respectively. That is, the data 800 in tensor form may include data for one or more stock exchanges as well as data for the first stock exchange, and may include data for one or more stocks related to the first stock as well as data for the first stock. When accumulating the data for multiple stock exchanges and/or the data for multiple stocks in a channel axis, the quantity data of the same buy price level at the same time point may be included in the same position in the data in tensor form, and accordingly, the machine learning model may collect such information and infer a prediction result.

Additionally or alternatively, the data 800 in tensor form may further include one or more channels representing coordinate information. For example, the data 800 in tensor form may further include two channels corresponding to 2D data including values indicative of coordinates on the X-axis, and 2D data including values indicative of coordinates on the Y-axis, respectively. In this case, the 2D data including values indicative of coordinates on the X-axis may vary only according to the X-axis coordinates, and the 2D data including values indicative of coordinates on the Y-axis may vary only according to Y-axis coordinates. Accordingly, the machine learning model that receives data in tensor form including one or more channels representing coordinate information may additionally use the information on the coordinate for the learning and inference, so as to output accurate prediction results based on accurate information on the position of each quantity data value.

Figure 9:
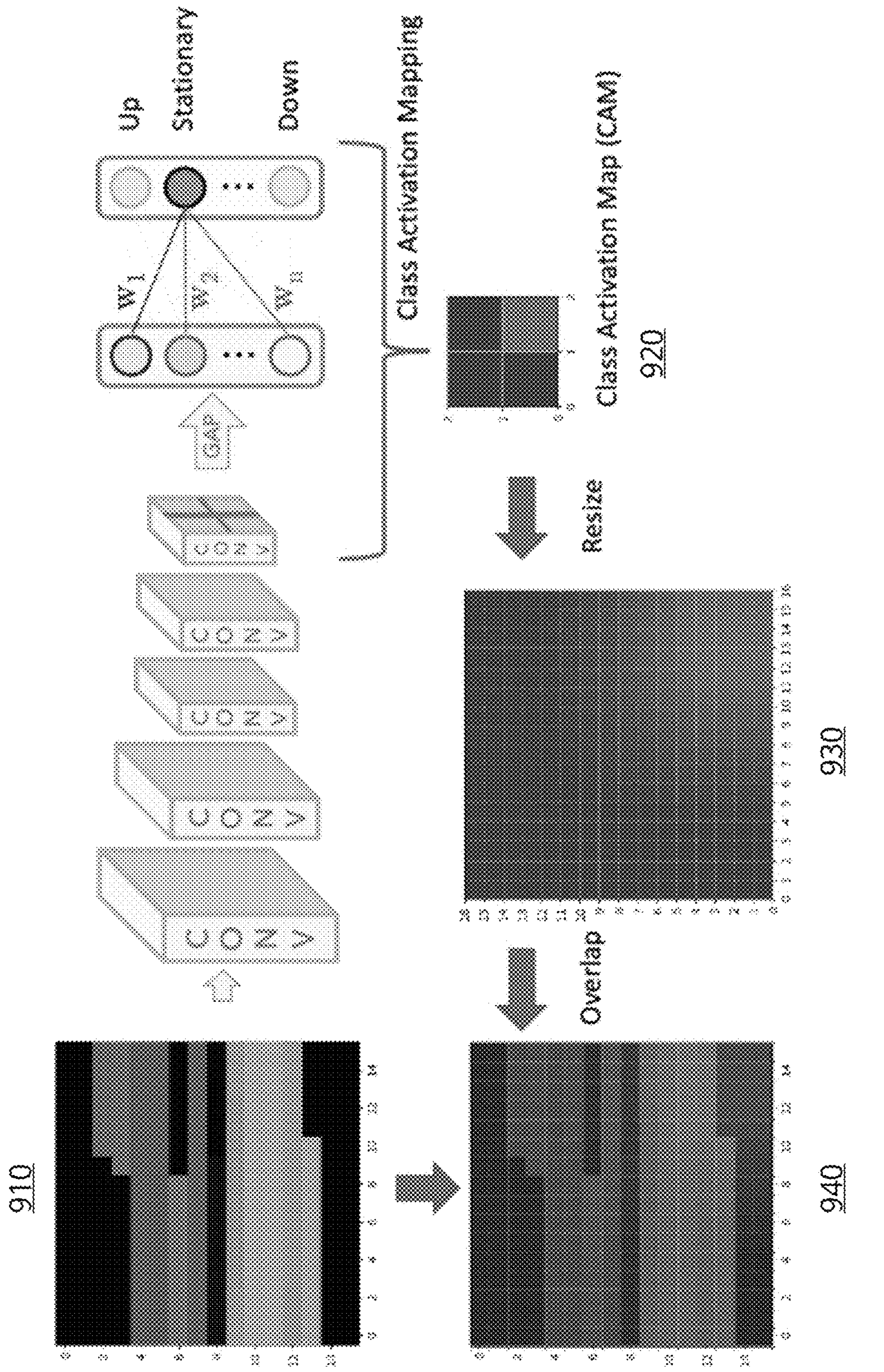
FIG. 9 is a diagram illustrating an example of a method for providing interpretation of a machine learning model.

FIG. 9 is a diagram illustrating an example of a method for providing interpretation of a machine learning model. The information processing system may input data 910 in tensor form to a machine learning model including a plurality of layers, and output a prediction result. In this case, the prediction result may include an up class indicating that the price of the specific stock at the future specific time point would be higher than specific the price at the current time point, a stationary class indicating that the price of the specific stock at the future specify time point would be the same as the price at the current time point, and an down class indicating that the price of the specific stock at the future specify time point would lower than specific the price at the current time point.

The information processing system may provide an interpretation of the prediction result output by the machine learning model. For example, the information processing system may use a class activation map (CAM) technique, a Grad-CAM technique, or the like to provide an interpretation map 920 including information on the position of a pixel that influenced the output of the prediction result of the machine learning model. The interpretation map 920 may be represented in a 2D image. For example, the interpretation map 920 may be represented in a heat map in which a color is displayed on each pixel included in the interpretation map 920 according to the degree of influence on the output of the prediction result. As a specific example, the interpretation map 920 may be represented in a continuous heat map in which the corresponding pixel is displayed in red as the degree of influence of the specific pixel on the output of the prediction result increases, the corresponding pixel is displayed in blue as the degree of influence of a specific pixel on the output of the prediction result increases, and the corresponding pixel is displayed as one of continuous colors between red and blue according to the degree of influence of a specific pixel on the output of the prediction result. As another specific example, the interpretation map 920 may be represented in a discontinuous heat map displayed in discontinuous colors according to the degree of influence of a specific pixel on the output of a prediction result or a range to which a ranking belongs.

In addition, the information processing system may apply the interpretation map 920 to the input data 910 to provide input data 940 applied with the interpretation map in order to easily identify the position of the pixel that influenced the output of a prediction result in the input data 910. For example, the information processing system may overlap the interpretation map 920 on the input data 910 to generate and provide the input data 940 applied with the interpretation map. As another example, the information processing system may provide information on (n) points of the input data that most influenced on the output of the prediction result.

In general, since the size (size of the x-axis and y-axis) of the interpretation map 920 that passed a plurality of layers is smaller than the size of the input data, the interpretation map 920 has to be adjusted to the same size as the input data 910 in order to be applied to the input data 910. There is a problem in that the interpretation map 930 in the adjusted size may not include accurate information on the position of the pixel that influenced the output of the prediction result and include only the information on the approximate position.

In addition, the input data 910 may be data in tensor form (e.g., a 2D image) including one or more 2D data items for a machine learning model, and this data does not include any information on the axis, and accordingly, it may not be easy for a user to determine which information influenced the output of the prediction result by viewing the input data 940 applied with the interpretation map.

Figure 10:
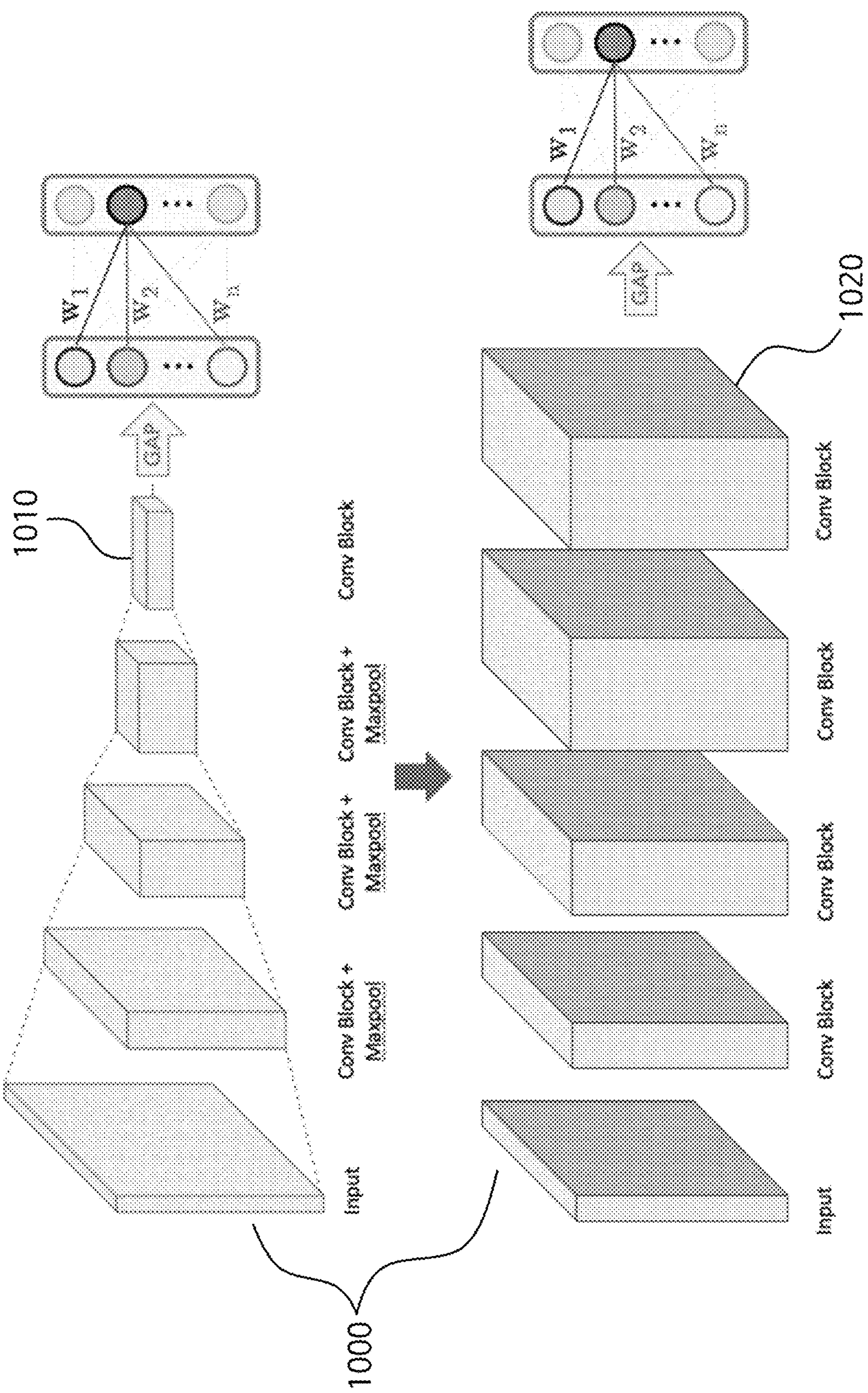
FIG. 10 is a diagram illustrating an example of a machine learning model for providing an interpretation map having the same size as 2D data included in input data.

FIG. 10 is a diagram illustrating an example of a machine learning model for providing an interpretation map having the same size as 2D data included in input data. FIG. 10 illustrates a CNN model as an example of a machine learning model. The plurality of layers included in the machine learning model may include a layer configured to reduce the size of the feature map. For example, a pooling layer (e.g., Maxpool in FIG. 10) included in the CNN model, a stride layer set to perform an operation while moving by 2 pixels or more when a convolution filter is applied, and the like may be used to reduce the size of the feature map. Accordingly, the size of a feature map 1010 that is an output from the last layer of the plurality of layers before global average pooling (GAP) may be smaller than the size of an input feature map 1000. In addition, the size of the interpretation map may be smaller than the size of the input feature map 1000.

In order to solve such a problem, the information processing system may use a machine learning model that is removed of all the layers configured to reduce the size of the feature map. Using the machine learning model removed of all the layers configured to reduce the size of the feature map, the size of an output feature map 1020 from the last layer before the GAP can be the same as the size of the input feature map 1000, and accordingly, the size of the interpretation map can also be the same as the size of the input feature map 1000.

Figure 11:
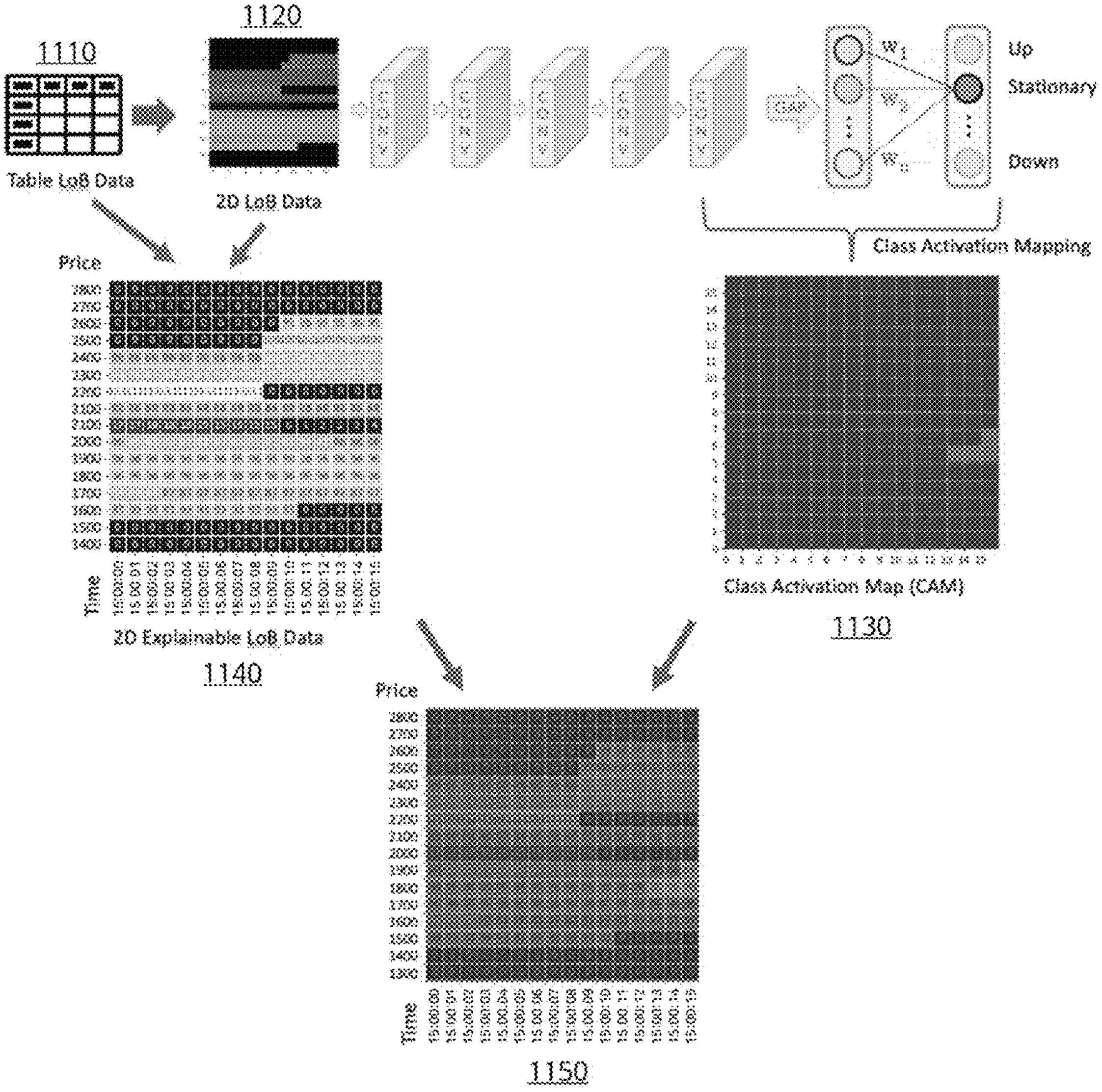
FIG. 11 is a diagram illustrating an example of a method for providing an interpretation map having the same size as 2D data included in input data.

FIG. 11 is a diagram illustrating an example of a method for providing an interpretation map 1130 having the same size as 2D data included in input data. The information processing system may convert data 1110 in table form into data 1120 in tensor form that includes 2D data corresponding to each of one or more channels, and input the converted data 1120 in tensor form into a machine learning model including a plurality of layers to output a prediction result. In this case, the machine learning model may be a model from which all the layers configured to reduce the size of the feature map are removed. That is, by removing all the layers configured to reduce the size of the feature map from the machine learning model, the size of the feature map that is an output from each layer may be the same as the size of the 2D data included in the data 1120 in tensor form.

The information processing system may generate an interpretation map 1130 including information on the position of the pixel that influenced the output of the prediction result of the machine learning model. For example, the information processing system may generate the interpretation map 1130 by using a feature map that is an output from at least one layer of the plurality of layers. In this case, since the size of the feature map that is an output from each layer is the same as the size of the 2D data included in the input data 1120, the size of the interpretation map 1130 generated based on this may also be the same as the size of the 2D data included in the input data 1120. Therefore, it is not necessary to adjust the interpretation map 1130 to the same size as the size of the 2D data included in the input data 1120, and the interpretation map 1130 including information on an exact position rather than an approximate position of a pixel that influenced the output of a prediction result can be generated.

Additionally, the information processing system may generate an explainable data 1140 based on the data 1110 in table form and the data 1120 in tensor form. The explainable data may refer to data that can be intuitively understood and/or interpreted by a user viewing the data. For example, with respect to the data 1120 in tensor form converted based on the order book data, the explainable data can be generated by adding information on an axis of 2D data (e.g., information about time axis, price axis) and changing each pixel value to a value of the original data (e.g., non-normalized quantity information) while maintaining the structure and size of the 2D data.

The information processing system may apply the interpretation map 1130 to the explainable data 1140. For example, the information processing system may overlap the interpretation map 1130 on the explainable data 1140 to generate explainable data 1150 applied with the interpretation map. With such a configuration, it is possible to accurately and intuitively confirm the data that influenced the output of the prediction result.

Figure 12:
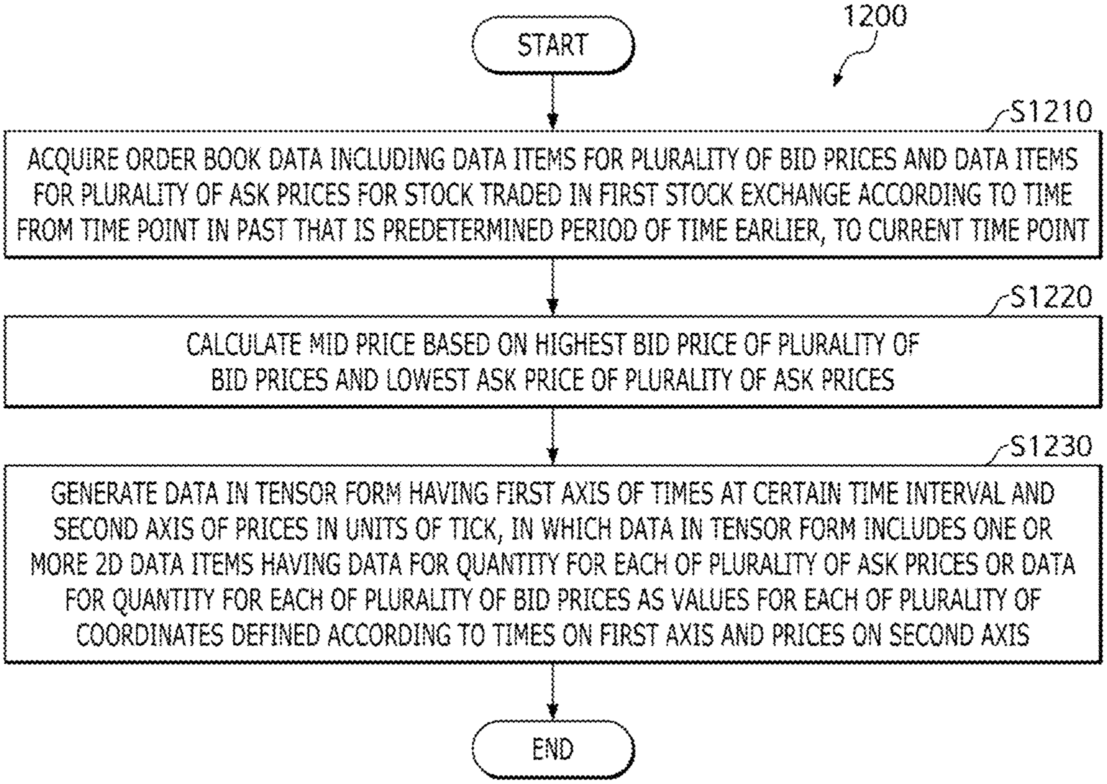
FIG. 12 is a flowchart illustrating an example of a method for converting order book data into 2D data for a machine learning model.

FIG. 12 is a flowchart illustrating an example of a method 1200 for converting order book data into 2D data for a machine learning model. The method 1200 may be initiated by the processor acquiring the order book data including data items for a plurality of bid prices and data items for a plurality of ask prices for a stock traded in a first stock exchange according to time from a time point in the past that is a predetermined period of time earlier, to a current time point, at S1210.

The processor may calculate a mid price based on the highest bid price of a plurality of bid prices and a lowest ask price of the plurality of ask prices, at S1220.

The data item may generate data in tensor form in which the time at a certain time interval is on the first axis and the price in units of tick is on the second axis, including one or more 2D data items having data for a quantity for each of the plurality of ask prices or data for a quantity for each of the plurality of bid prices as values for each of a plurality of coordinates defined according to the time on the first axis and the price on the second axis, at S1230. In this case, the price in units of tick included in the second axis may include the calculated mid price. The processor may normalize the data for each quantity of a plurality of ask prices or data for each quantity of the plurality of bid prices, and associate the data with each of a plurality of coordinates defined according to the time on the first axis and the price on the second axis.

The data in tensor form may include 2D data corresponding to each of a plurality of channels, such as, for example, 2D data corresponding to the first channel, which is for a bid price of a stock traded in the first stock exchange according to time, and 2D data corresponding to the second channel, which is for an ask price of a stock traded in the first stock exchange according to time. Additionally, the data in tensor form may further include, for example, 2D data corresponding to the third channel, which is for a bid price of a stock traded in the second stock exchange according to time, and 2D data corresponding to the fourth channel, for an ask price of a stock traded in the second stock exchange according to time.

Additionally or alternatively, the data in tensor form may further include 2D data including a value indicative of a coordinates on a first axis in each of the one or more 2D data items, and 2D data including a value indicative of a coordinates on a second axis in each of the one or more 2D data items.

The processor may input the generated data in tensor form into a machine learning model including a plurality of layers to output the prediction result. In this case, the prediction result may include prediction information on the price of the stock at a time point in the future that is a predetermined period of time after the current time point. For example, the prediction information on the price of a stock at a time point in the future may include a first class indicating that the price of the specific stock at the time point in the future would be higher than the price at the current time point, a second class indicating that the price of the specific stock at the time point in the future would be the same as the price at the current time point, and a third class indicating that the price of the specific stock at the time point in the future would be lower than the price at the current time point.

As the current time point changes, the processor may repeatedly perform at least some of the processes described above on the order book data, starting from the changed current time point and back to a time point in the past that is a predetermined period earlier.

Figure 13:
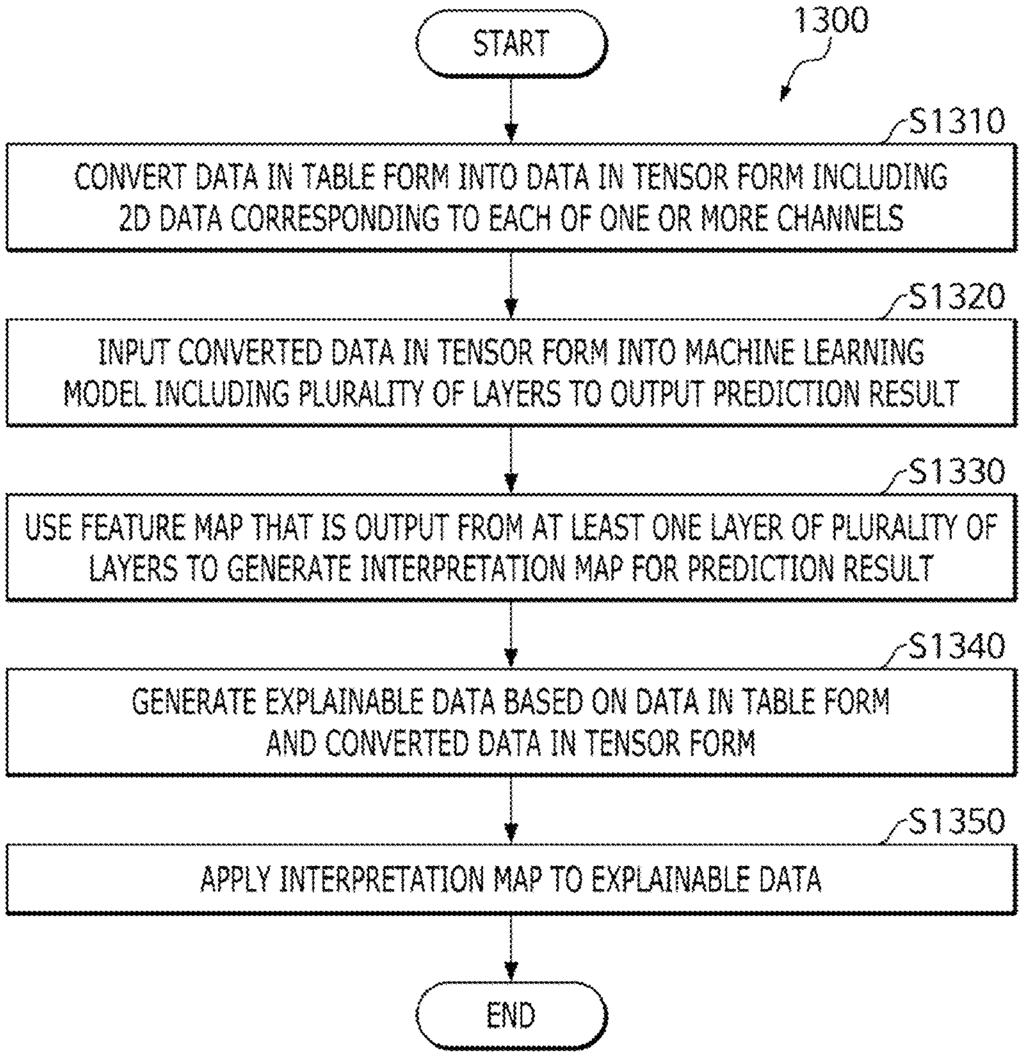
FIG. 13 is a flowchart illustrating an example of a method for providing interpretation of a machine learning model.

FIG. 13 is a flowchart illustrating an example of a method 1300 for providing interpretation of a machine learning model. The method 1300 may be initiated by the processor (e.g., one or more processors in the information processing system) converting the data in table form into data in tensor form including two-dimensional (2D) data corresponding to each of one or more channels, at S1310. The data in table form may include information on a bid price and an ask price of a stock of a stock exchange according to time.

The data in tensor form may include, for example, 2D data corresponding to the first channel, which is for a bid price of a stock traded in the first stock exchange according to time, and 2D data corresponding to the second channel, which is for an ask price of a stock traded in the first stock exchange according to time.

Additionally, the data in tensor form may further include, for example, 2D data corresponding to the third channel, which is for a bid price of a stock traded in the second stock exchange according to time, and 2D data corresponding to the fourth channel, for an ask price of a stock traded in the second stock exchange according to time.

the processor may input the converted data in tensor form into a machine learning model including a plurality of layers to output the prediction result, at S1320. The prediction result may include prediction information on the price of a specific stock at a time point in the future that is a predetermined period of time after the current time point. As a specific example, the prediction information on the price of a specific stock may include a first class indicating that the price of the specific stock at the time point in the future would be higher than the price at the current time point, a second class indicating that the price of the specific stock at the time point in the future would be the same as the price at the current time point, and a third class indicating that the price of the specific stock at the time point in the future would be lower than the price at the current time point.

The processor may use a feature map that is an output from at least one layer of the plurality of layers to generate an interpretation map for the prediction result, at S1330. For example, the processor may use the feature map that is an output from the last layer of the machine learning model to generate an interpretation map for the prediction result. In this case, the feature map and/or the interpretation map that are outputs from the last layer of the machine learning model may include 2D data, and the machine learning model may be configured such that the size of the feature map and/or the size of the interpretation map that are outputs from the last layer of machine learning have the same size as the size of 2D data included in the data in tensor form.

The interpretation map for the prediction result may be represented in a 2D image, and the 2D image of the interpretation map may include information on pixels included in the 2D image of the interpretation map that influenced the output of the prediction result. For example, the 2D image of the interpretation map may include a heat map in which a color expressed according to the degree of influence on the output of a prediction result is displayed on each pixel included in the image.

The processor may generate explainable data based on the data in table form and the converted data in tensor form, at S1340. In this case, the explainable data may refer to data that can be intuitively understood and/or interpreted by a user viewing the corresponding data.

The processor may apply the interpretation map to the explainable data, at S1350. For example, the processor may overlap the heat map on the explainable data to apply an interpretation map to the explainable data.

The flowcharts of FIGS. 12 and 13 and the above description are merely examples, and may be implemented in various ways in other embodiments. For example, the order of each operations may be changed, one or more operations may be added, or one or more operations may be omitted. As another example, one or more operations may be performed by different configurations.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

If implemented in software, the techniques may be stored on a computer-readable medium as one or more instructions or codes, or may be sent via a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for converting order book data into 2D data for a machine learning model, the method being performed by one or more processors and comprising:

- acquiring order book data including data for a plurality of bid prices and data for a plurality of ask prices for a stock traded in a first stock exchange according to time from a time point in the past that is a predetermined period of time earlier, to a current time point;
- converting the order book data into data in tensor form having a first axis of times at certain time intervals and a second axis of prices in units of tick, wherein the data in tensor form includes one or more 2D data items having data for a quantity for each of the plurality of ask prices or data for a quantity for each of the plurality of bid prices as values for each of a plurality of coordinates defined according to the times on the first axis and the prices on the second axis;
- inputting the data in tensor form to the machine learning model; and
- predicting using the machine learning model, information on a price of the stock at a time point in a future based on the data in tensor form, wherein the machine learning model includes a plurality of successive layers, and wherein each of the successive layers is configured to reduce the size of a feature map corresponding to an output of a previous layer.

2. The method according to claim 1, wherein the data in tensor form includes 2D data corresponding to each of a plurality of channels,

- the plurality of channels includes a first channel and a second channel, and
- the data in tensor form includes:
  - 2D data corresponding to the first channel, which is for a bid price of a stock traded in the first stock exchange according to the time; and
  - 2D data corresponding to the second channel, which is for an ask price of a stock traded in the first stock exchange according to the time.

3. The method according to claim 2, wherein the data in tensor form further includes a third channel and a fourth channel, and

- the data in tensor form further includes:
  - 2D data corresponding to the third channel, which is for the bid price of the stock traded in a second stock exchange according to the time; and
  - 2D data corresponding to the fourth channel, which is for the ask price of the stock traded in the second stock exchange according to the time.

4. The method according to claim 2, wherein the data in tensor form further includes a fifth channel and a sixth channel, and

- the data in tensor form further includes:
  - 2D data including a value indicative of coordinates on the first axis in each of the one or more 2D data items; and
  - 2D data including a value indicative of coordinates on the second axis in each of the one or more 2D data items.

5. The method according to claim 1, wherein the converting includes:

- normalizing a quantity for each of the plurality of ask prices and a quantity for each of the plurality of bid prices; and
- associating the normalized quantity with each of a plurality of coordinates defined according to the times on the first axis and the prices on the second axis.

6. The method according to claim 1, further comprising, as the current time point changes, repeatedly performing the acquiring, and the converting with respect to the order book data from the changed current time point to a time point in the past that is the predetermined period earlier.

7. The method according to claim 6, wherein

- prediction information on the price of the stock at the time point in the future is a predetermined period of time after the current time point.

8. The method according to claim 7, wherein the prediction information includes:

- a first class indicating that the price of the stock at the time point in the future would be higher than a price at the current time point;
- a second class indicating that the price of the stock at the time point in the future would be the same as the price at the current time point; and
- a third class indicating that the price of the stock at the time point in the future would be lower than the price at the current time point.

9. A non-transitory computer-readable recording medium storing instructions that, when executed by one or more processors, cause performance of the method according to claim 1.

10. A system for converting order book data into 2D data for a machine learning model, comprising:

- a memory storing one or more instructions; and
- one or more processors configured to execute one or more instructions in the memory to:
- acquire order book data including data for a plurality of bid prices and data for a plurality of ask prices for a stock traded in a first stock exchange according to time from a time point in the past that is a predetermined period of time earlier, to a current time point;
- convert the order book data into data in tensor form having a first axis of times at certain time intervals and a second axis of prices in units of tick, wherein the data in tensor form includes one or more 2D data items having data for a quantity for each of the plurality of ask prices or data for a quantity for each of the plurality of bid prices as values for each of a plurality of coordinates defined according to the times on the first axis and the prices on the second axis;

input the data in tensor form to the machine learning model; and predict, using the machine learning model, information on a price of the stock at a time point in a future based on the data in tensor form, wherein the machine learning model includes a plurality of successive layers, and wherein each of the successive layers is configured to reduce the size of a feature map corresponding to an output of a previous layer.

11. The system according to claim 10, wherein the data in tensor form includes 2D data corresponding to each of a plurality of channels, the plurality of channels includes a first channel and a second channel, and the data in tensor form further includes:

2D data corresponding to the first channel, which is for a bid price of a stock traded in the first stock exchange according to the time; and 2D data corresponding to the second channel, which is for an ask price of a stock traded in the first stock exchange according to the time.

12. The system according to claim 11, wherein the data in tensor form further includes a third channel and a fourth channel, and the data in tensor form further includes:

2D data corresponding to the third channel, which is for the bid price of the stock traded in a second stock exchange according to the time; and 2D data corresponding to the fourth channel, which is for the ask price of the stock traded in the second stock exchange according to the time.

13. The system according to claim 11, wherein the data in tensor form further includes a fifth channel and a sixth channel, and the data in tensor form further includes:

2D data including a value indicative of coordinates on the first axis in each of the one or more 2D data items; and 2D data including a value indicative of coordinates on the second axis in each of the one or more 2D data items.

14. The system according to claim 10, wherein the converting the order book data into the data in tensor form includes:

normalizing a quantity for each of the plurality of ask prices and a quantity for each of the plurality of bid prices; and associating the normalized quantity with each of a plurality of coordinates defined according to the times on the first axis and the prices on the second axis.

15. The system according to claim 10, wherein the one or more processors are further configured to, as the current time point changes, repeatedly perform the acquiring, and the converting with respect to the order book data from the changed current time point to a time point in the past that is the predetermined period earlier.

16. The system according to claim 15, wherein the time point in the future is a predetermined period of time after the current time point.

17. The system according to claim 16, wherein the prediction information includes:

a first class indicating that the price of the stock at the time point in the future would be higher than a price at the current time point;

a second class indicating that the price of the stock at the time point in the future would be the same as the price at the current time point; and a third class indicating that the price of the stock at the time point in the future would be lower than the price at the current time point.

* * * * *